(12) United States Patent
Tomimatsu (10) Patent No.: US 8,118,353 B2
(45) Date of Patent: Feb. 21, 2012

(54) MOUNTING STRUCTURE OF FRONT PANEL (75) Inventor: Hirokazu Tomimatsu, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 205 days.

(21) Appl. No.: 12/445,870

(22) PCT Filed: Oct. 15, 2007

(86) PCT No.: PCT/JP2007/070055
§ 371 (c)(1),
(2), (4) Date: Apr. 16, 2009

(87) PCT Pub. No.: WO2008/047748
PCT Pub. Date: Apr. 24, 2008

(65) Prior Publication Data
US 2011/0018310 A1    Jan. 27, 2011

(30) Foreign Application Priority Data
Oct. 20, 2006  (JP) ................. 2006-286379

(51) Int. Cl.
*B62D 25/08*  (2006.01)
*B62D 27/06*  (2006.01)
(52) U.S. Cl. ............. 296/203.02; 296/193.09; 296/29; 296/191

(58) Field of Classification Search ............. 296/203.01, 296/203.02, 193.01, 193.09, 29, 30, 191
See application file for complete search history.

(56) References Cited

U.S. PATENT DOCUMENTS
3,875,661 A * 4/1975 Lidstrom et al. ............... 296/191
5,226,695 A * 7/1993 Flint et al. ...................... 296/191

FOREIGN PATENT DOCUMENTS
JP  64-035206 U   3/1989
JP  10-167118 A   6/1998
JP  2000-128022 A 5/2000

* cited by examiner

*Primary Examiner* — Dennis Pedder (57) ABSTRACT

A front panel mounting structure 1 is formed of a front body 2 including two pins each having a locking portion and a clip member, and a front panel 30 including two fasteners each having an engaging portion and a flange portion. In a mounted state where the front panel 30 occludes an opening 3, the clip member engages with the flange portion while the pins respectively engage with the fasteners. In the mounted state, the locking portions engage with the engaging portions to restrict movement of the front panel 30 downward and in the vehicle-width direction. Moreover, the clip member sandwiches the flange portion in a longitudinal direction to restrict movement of the front panel 30 in the longitudinal direction.

12 Claims, 7 Drawing Sheets

FIG. 9

MOUNTING STRUCTURE OF FRONT PANEL

TECHNICAL FIELD

The present invention relates to a mounting structure of a front panel mounted on a front body of a vehicle.

BACKGROUND ART

In a freight vehicle where a seating position of a driver's seat inside a cabin is located roughly in front of an engine (hereinafter referred to as a cab-over truck), an opening is formed in a vehicle-width direction at a front part thereof (a front body), and a front panel is mounted on the front body in a position to occlude the opening.
Patent Document 1: JP-A 2000-128022

DISCLOSURE OF THE INVENTION

Problems to be Solved by the Invention

Here, in general, the front panel is mounted on the front body firstly by positioning the front panel in a predetermined position to occlude the opening and then by joining a peripheral portion of the opening and an outer peripheral portion of the front panel by way of bolting, welding or the like. However, since the front panel is a relatively-large-sized component having substantially the same shape as the opening, the front panel is likely to move in any directions of vertical and longitudinal directions and a vehicle-width direction when being mounted on the front body. For this reason, positioning of the front panel may be difficult. In this case, displacement of the front panel complicates an operation to mount the front panel on the front body.

Meanwhile, if a gap is formed between the peripheral portion of the opening and the outer peripheral portion of the front panel due to the displacement of the front panel, the gap may affect the external appearance. In particular, the opening and the front panel have horizontally long shapes. Accordingly, even when the front panel is mounted on the front body without being displaced in the vertical and vehicle-width directions, the front panel may be displaced in the longitudinal direction. In such a case, the external appearance is deteriorated.

Therefore, it is an object of the present invention to provide a mounting structure of a front panel capable of achieving an easier mounting operation of a front panel by easily positioning the front panel and of improving external appearance at the same time.

Means for Solving the Problems

To attain the object, the present invention provides a mounting structure of a front panel mounted on a front body to occlude an opening of the front body, the front body arranged in a vehicle-width direction, the structure including a first mount portion, at least two second mount portions, a first mount-base portion, and at least two second mount-base portions. The first mount portion is provided to the front panel. The second mount portions are provided at both sides in the vehicle-width direction of the first mount portion on an upper fringe portion of the front panel. The first mount-base portion is provided to an upper fringe portion of the opening of the front body and engages with the first mount portion in a mounted state where the front panel occludes the opening. The second mount-base portions are provided at both sides in the vehicle-width direction of the first mount-base portion of the upper fringe portion of the opening and respectively engage with the second mount portions in the mounted state. One of the first mount portion and the first mount-base portion includes a flange portion which protrudes toward the other one of the first mount portion and the first mount-base portion. The other one of the first mount portion and the first mount-base portion includes a pair of sandwiching portions which sandwiches the flange portion in a longitudinal direction in the mounted state. One of each of the second mount portions and each of the second mount-base portions includes a locking portion and a protruding portion which protrudes toward the other one of the second mount portion and the second mount-base portion. The other one of the second mount portion and the second mount-base portion includes an engaging portion which engages with the locking portion in the mounted state and a hole portion into which the protruding portion is inserted in the mounted state. In an insertion starting state where the protruding portion starts to be inserted into the hole portion, the flange portion is away from the pair of sandwiching portions. As the front panel moves upward from the insertion starting state to the mounted state, the flange portion is inserted between the pair of sandwiching portions. In the mounted state, the locking portion engages with the engaging portion to restrict movement of the front panel downward and in the vehicle-width direction, and the pair of sandwiching portions sandwich the flange portion in the longitudinal direction to restrict movement of the front panel in the longitudinal direction. The hole regulates an insertion direction of the protruding portion and guides the front panel that moves upward from the insertion starting state to the mounted state.

In the above-described configuration, the front panel is mounted on the front body by engaging the first mount portion provided to the upper fringe portion of the front panel with the first mount-base portion provided to the upper fringe portion of the opening and engaging the second mount portions provided at both sides in the vehicle-width direction of the first mount portion with the second mount-base portions provided at both sides in the vehicle-width direction of the first mount-base portion, thereby establishing the mounted state of occluding the opening of the front body. The operation to mount the front panel on the front body will be described further in detail. First, the protruding portions provided to one of the second mount portions and the second mount-base portions are inserted into the hole portions provided to the other one of the second mount portions and the second mount-base portions (the insertion starting state). Next, as the front panel is moved upward from the insertion starting state to the mounted state, the protruding portions move toward the other one of the second mount portions and the second mount-base portions while being guided by the hole portions, and the flange portion provided to the other one of the first mount portion and the first mount-base portion is inserted between the pair of sandwiching portions provided to one of the first mount portion and the first mount-base portion. Thereafter, the locking portions provided to one of the second mount portions and the second mount-base portions engage with the engaging portions provided to the other one of the second mount portions and the second mount-base portions and the flange portion is sandwiched between the pair of sandwiching portions. In this manner, the front panel is brought into the mounted state. When the front panel is brought into the mounted state, the movement of the front panel downward and in the vehicle-width direction is restricted by the engagement of the locking portions with the engaging portions, and the movement of the front panel in the longitudinal direction is restricted by the flange portion being sandwiched between the pair of sandwiching portions in the longitudinal direction. In essence, the front panel is positioned in the vehicle-width direction in such a manner that the front panel is moved upward by inserting the protruding portions into the hole portions, and that the locking portions thereby engage with the engaging portions. Meanwhile, the front panel is positioned in the longitudinal direction by sandwiching the flange portion between the pair of sandwiching portions. Therefore, the front panel can be positioned easily. Hence the mounting operation of the front panel can be surely made easier.

In the mounted state of the front panel, the front panel is positioned in the vertical direction, in the vehicle-width direction, and in the longitudinal direction. Accordingly, an even gap can be formed between the peripheral portion of the opening of the front body and the outer peripheral portion of the front panel. Therefore, external appearance can be reliably improved.

Meanwhile, the front panel can be mounted on the front body so that the upper fringe portion thereof may come into contact with the upper fringe portion of the opening by causing the flange portion to be sandwiched between the pair of sandwiching portions. Therefore, stiffness of the front body and the front panel at the contact point can be enhanced.

Moreover, it is also possible to provide the hole portion in the second mount portion of the front panel and to provide the protruding portion to the second mount-base portion of the front body.

In the above-described configuration, since the protruding portions are provided on the front body side, the front body is less likely to be damaged because the protruding portions do not come in contact with the front body when the front panel is mounted on the front body.

Effect of the Invention

According to the present invention, the front panel can be positioned easily. Therefore, it is possible to simplify the operation to mount the front panel on the front body and to reliably improve external appearance.

BRIEF DESCRIPTION OF THE DRAWINGS

FIGS. 8(A) to 8(C) are cross-sectional views taken along a B-B arrow in FIG. 3, in which FIG. 8(A) shows a mounting starting state of starting mounting of the front panel to the front body, FIG. 8(B) shows a state in the course of mounting the front panel to the front body, and FIG. 8(C) shows a mounting completion state of completing mounting of the front panel to the front body.

FIGS. 9(A) to 9(C) are cross-sectional views taken along an A-A arrow in FIG. 2, in which FIG. 9(A) shows the mounting starting state of starting mounting of the front panel to the front body, FIG. 9(B) shows the state in the course of mounting the front panel to the front body, and FIG. 9(C) shows the mounting completion state of completing mounting of the front panel to the front body.

EXPLANATION OF REFERENCE NUMERALS

1 FRONT PANEL MOUNTING STRUCTURE
2 FRONT BODY
3 OPENING
4 UPPER FRINGE PORTION
10 CLIP MEMBER (FIRST MOUNT-BASE PORTION)
11 REAR CLAMP PORTION (SANDWICHING PORTION)
14 FRONT CLAMP PORTION (SANDWICHING PORTION)
20 PIN (SECOND MOUNT-BASE PORTION)
26 LOCKING PORTION
27 PROTRUDING PORTION
30 FRONT PANEL
32 UPPER FRINGE PORTION
43 FLANGE PORTION (FIRST MOUNT PORTION)
55 FASTENER (SECOND MOUNT PORTION)
59 HOLE PORTION

BEST MODE FOR CARRYING OUT THE INVENTION

Figure 1:
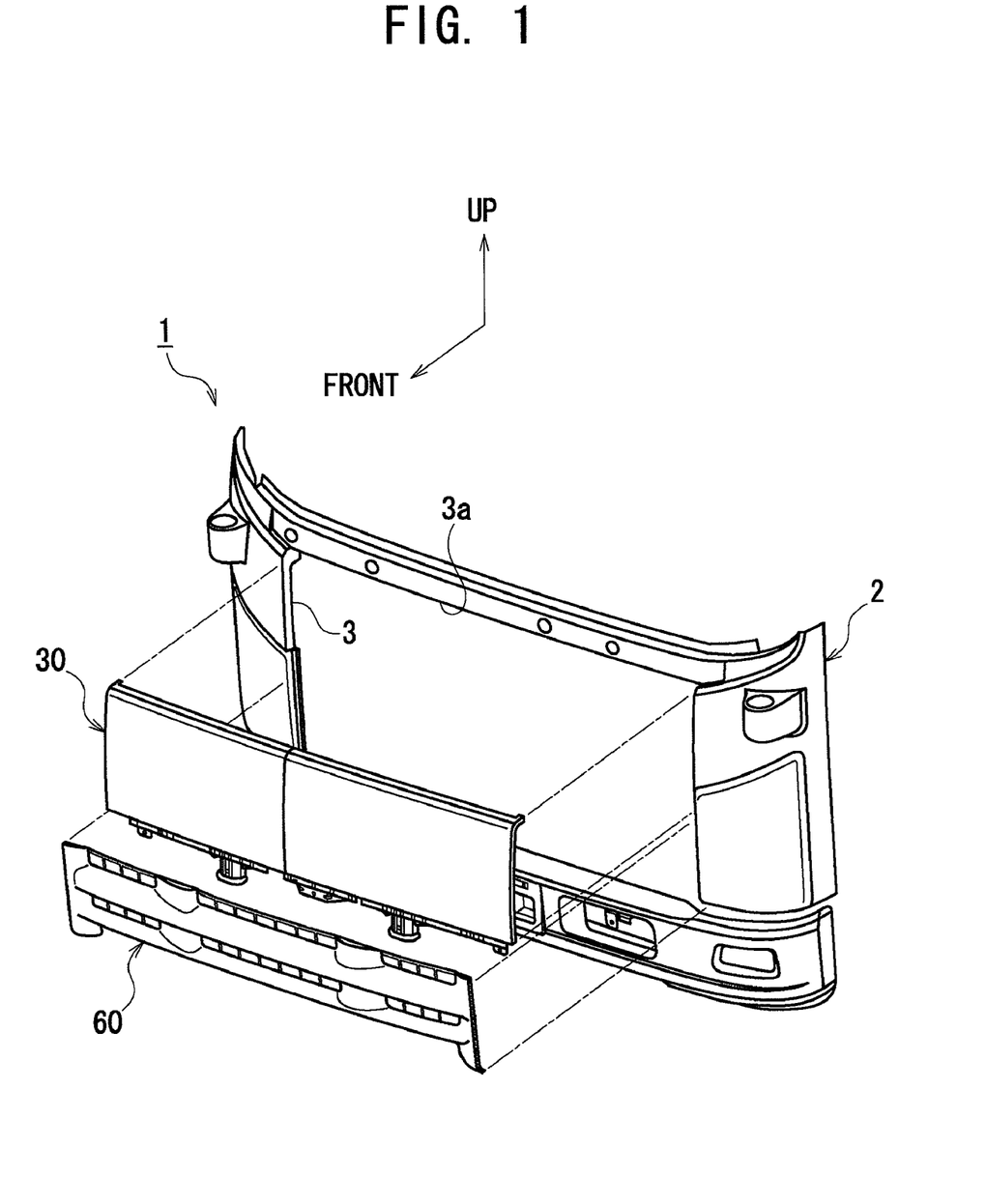
FIG. 1 is an exploded perspective view of a mounting structure of a front panel according to this embodiment.
Figure 2:
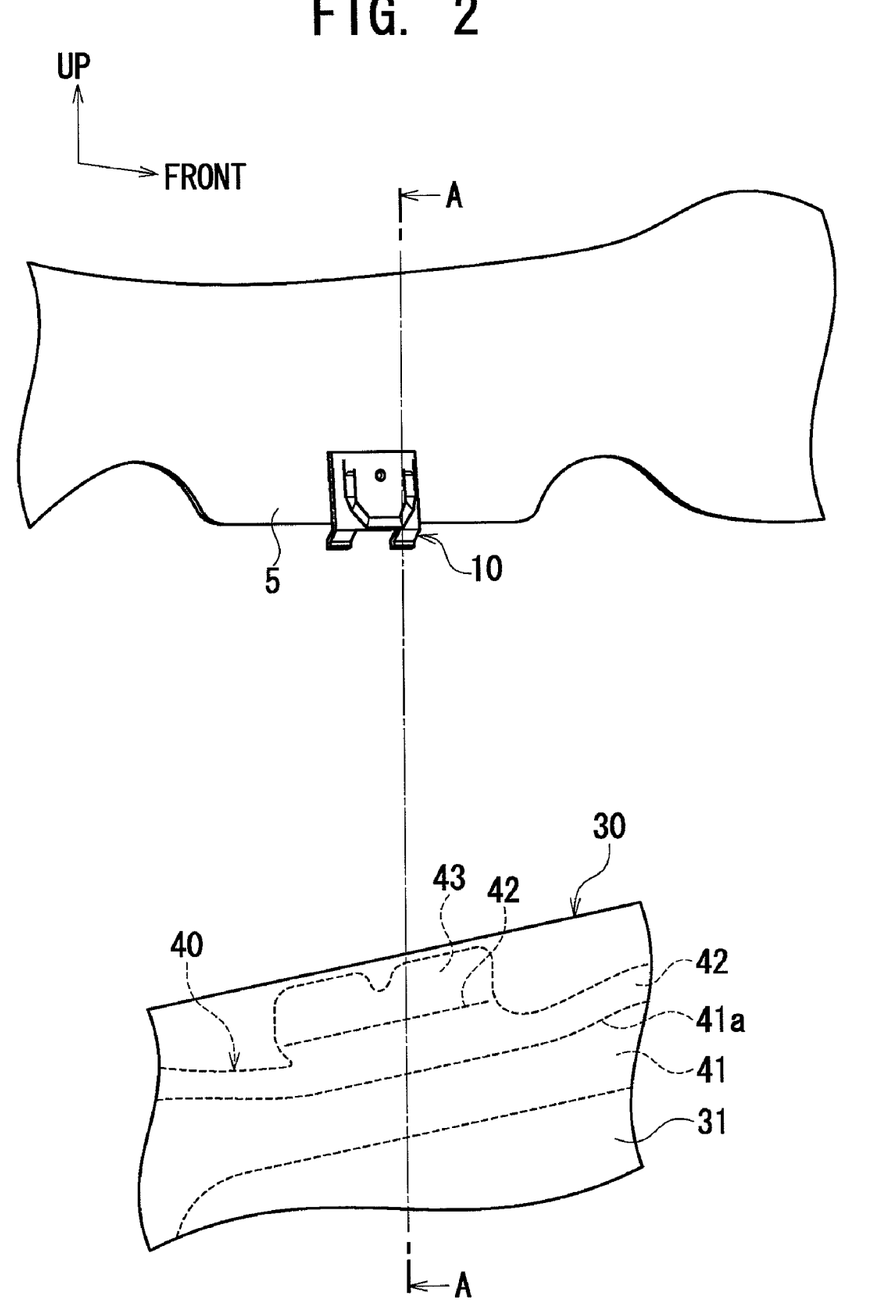
FIG. 2 is a schematic perspective view showing substantially central portions of a front body and the front panel.
Figure 3:
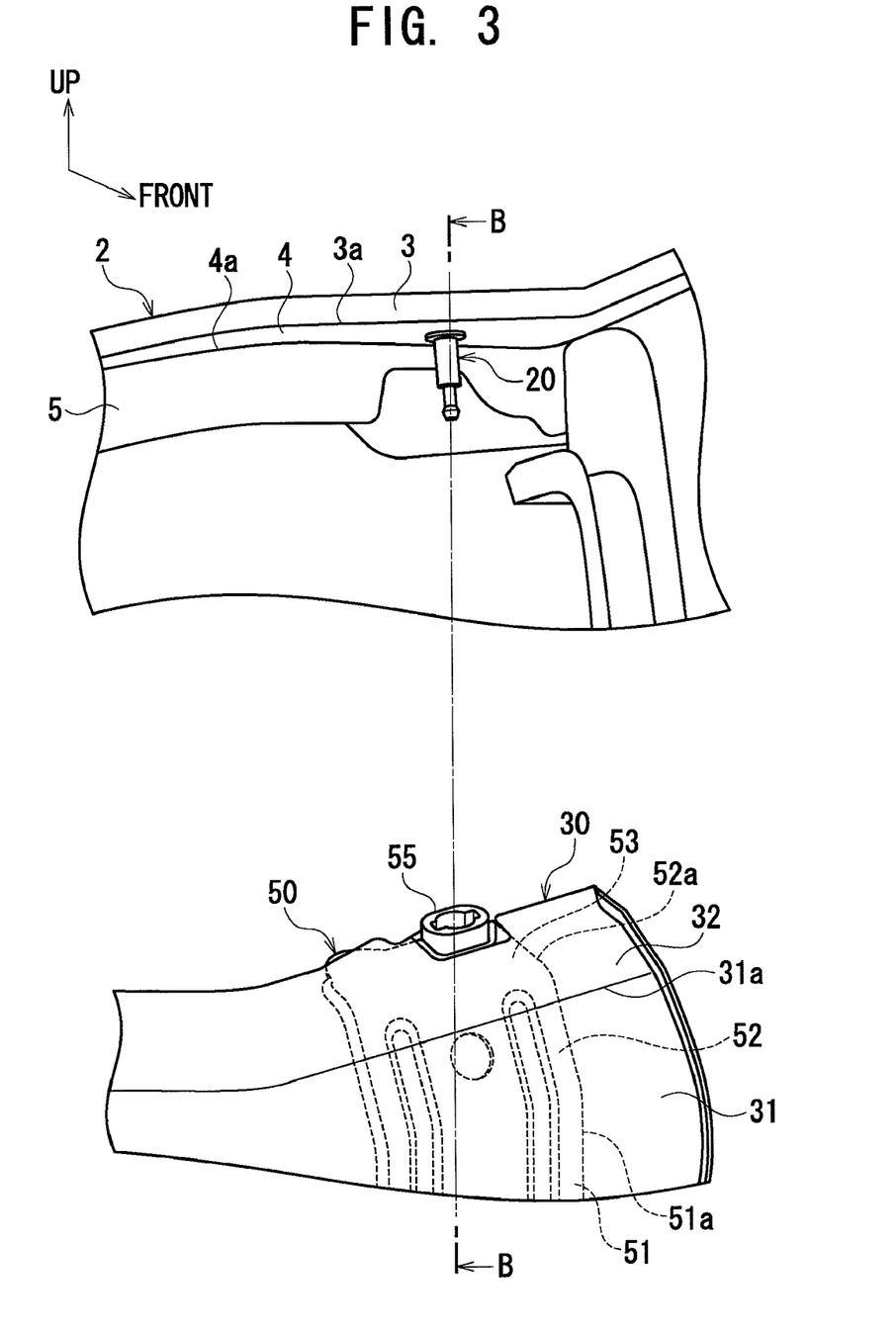
FIG. 3 is a schematic perspective view showing outside portions in a vehicle-width direction of the front body and the front panel.
Figure 4:
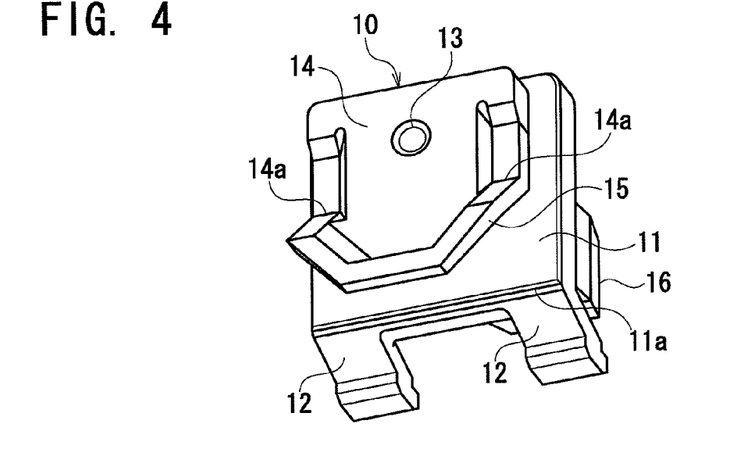
FIG. 4 is a schematic perspective view showing a clip member.
Figure 5:
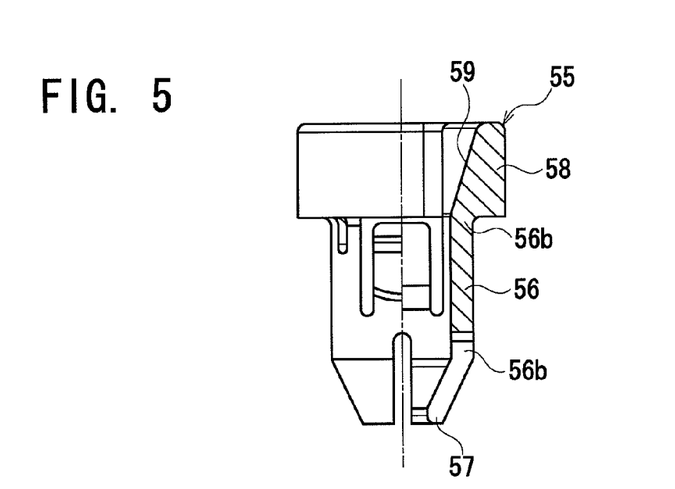
FIG. 5 is a partial cross-sectional view showing a fastener.
Figure 6:
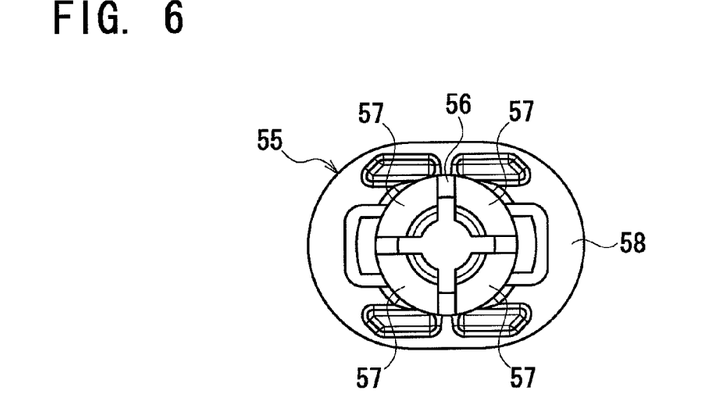
FIG. 6 is a schematic view showing the fastener viewed from an engaging portion side.
Figure 7:
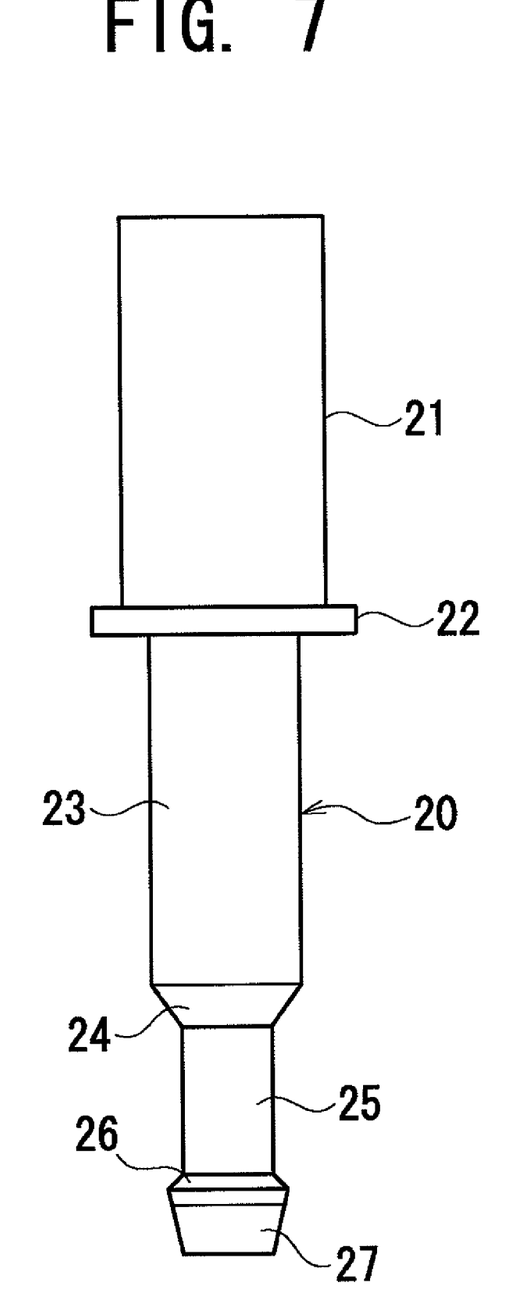
FIG. 7 is a schematic view showing a pin.

Now, an embodiment of the present invention will be described below based on the drawings. FIG. 1 is an exploded perspective view of a mounting structure of a front panel according to this embodiment, FIG. 2 is a schematic perspective view showing substantially central portions of a front body and the front panel, FIG. 3 is a schematic perspective view showing outside portions in a vehicle-width direction of the front body and the front panel, FIG. 4 is a schematic perspective view showing a clip member, FIG. 5 is a schematic cross-sectional view showing a fastener, FIG. 6 is a schematic view showing the fastener viewed from an engaging portion side, and FIG. 7 is a schematic view showing a pin, respectively. FIGS. 8(A) to 8(C) are cross-sectional views taken along a B-B arrow in FIG. 3, in which FIG. 8(A) shows a state of starting mounting to start mounting of the front panel to the front body, FIG. 8(B) shows a state in the course of mounting the front panel to the front body, and FIG. 8(C) shows a state of completing mounting to complete mounting of the front panel to the front body. FIGS. 9(A) to 9(C) are cross-sectional views taken along an A-A arrow in FIG. 2, in which FIG. 9(A) shows the state of starting mounting to start mounting of the front panel to the front body, FIG. 9(B) shows the state in the course of mounting the front panel to the front body, and FIG. 9(C) shows the state of completing mounting to complete mounting of the front panel to the front body. Here, in the drawings, "UP" indicates an upside of a vehicle while "FRONT" indicates a front side of the vehicle.

As shown in FIGS. 1 to 9, a front panel mounting structure 1 includes a front body 2 and a front panel 30.

The front body 2 is disposed in a vehicle-width direction and includes an opening 3 having a substantially rectangular shape, an upper fringe portion 4 extending from an upper edge portion 3a of the opening 3 toward the back of a vehicle, and a downward extending portion 5 extending downward from a rear edge portion 4a of the upper fringe portion 4. A clip member 10 serving as a first mount-base portion is disposed in an unillustrated mounting hole formed substantially in the center in the vehicle-width direction of the downward extending portion 5, and pins 20 serving as second mount-base portions are respectively disposed in mounting holes 6 formed on both sides in the vehicle-width direction of the upper fringe portion 4.

The clip member 10 includes a rear clamp portion (a sandwiching portion) 11 having a substantially plate shape, a rear guide portions 12 extending from both sides in the vehicle-width direction of a lower edge portion 11a of the rear clamp portion 11 toward the lower back of the vehicle, and a tube portion 13 having a substantially cylindrical shape and extending from substantially the center of the rear clamp portion 11 toward the front of the vehicle. Moreover, the clip member 10 includes a front clamp portion (a sandwiching portion) 14 having a substantially plate shape and formed on a front end of the tube portion 13 to be parallel to the rear clamp portion 11, a front guide portion 15 extending from a lower edge portion 14a of the front clamp portion 14 toward the lower front of the vehicle, and an engaging portion 16 extending from substantially the center of the rear clamp portion 11 toward the back of the vehicle. The clip member 10 is fixed to the front body 2 by engaging the engaging portion 16 with the unillustrated mounting hole formed substantially in the center in the vehicle-width direction of the downward extending portion 5 by way of flexural deformation of the engaging portion 16. Here, the rear guide portions 12 and the front guide portion 15 guide a flange portion 43 to be described later to a gap between the rear clamp portion 11 and the front clamp portion 14.

Each pin 20 includes an upper column portion 21 having a substantially columnar shape with a diameter equal to a diameter of each mounting hole 6, a stopper plate portion 22 formed at a lower end of the upper column portion 21 and having a substantially disc shape with a diameter larger than the diameter of the mounting hole 6, and a middle column portion 23 formed at a lower end of the stopper plate portion 22 and having a substantially columnar shape with a diameter smaller than the diameter of the stopper plate portion 22. Moreover, the pin 20 includes a taper portion 24 formed at a lower end of the middle column portion 23 and having a substantially tapered shape, a lower column portion 25 formed at a lower end of the taper portion 24 and having a substantially columnar shape, a locking portion 26 formed at a lower end of the lower column portion 25 and having a substantially conical shape, and a protruding portion 27 formed at a lower end of the locking portion 26 and having a substantially mortar-like shape. The pin 20 is fixed to the front body 2 by inserting the upper column portion 21 into the mounting hole 6 from a surface of the upper fringe portion 4 so that the stopper plate portion 22 may abut on the surface of the upper fringe portion 4, and then by attaching, to the upper column portion 21, an anti-falling member 28 having substantially an annular shape from a rear surface of the upper fringe portion 4 in this state.

The front panel 30 is disposed in the vehicle-width direction in a position for occluding the opening 3 of the front body 2, and includes a panel body 31 having substantially a plate shape and an upper fringe portion 32 extending from an upper edge portion 31a of the panel body 31 toward the back of the vehicle. Moreover, a center reinforcing member 40 is provided substantially in the center on a rear surface of the front panel 30 and side reinforcing members 50 are provided on the outside portions in the vehicle-width direction of the rear surface thereof.

The center reinforcing member 40 includes a lower plate portion 41 having a substantially plate shape and arranged to be substantially parallel to the panel body 31, a middle plate portion 42 extending from an upper edge portion 41a of the lower plate portion 41 further toward the back of the vehicle than a rear edge portion 32a of the upper fringe portion 32, and the flange portion 43 serving as a first mount portion which extends upward from a rear edge portion 42a of the middle plate portion 42.

Each side reinforcing member 50 includes a lower plate portion 51 having a substantially plate shape and arranged to be substantially parallel to the panel body 31, a middle plate portion 52 extending from an upper edge portion 51a of the lower plate portion 51 toward the upper back, an upper plate portion 53 extending from an upper edge portion 52a of the middle plate portion 52 further toward the back of the vehicle than the rear edge portion 32a of the upper fringe portion 32, a mounting hole 54 having a substantially circular shape which is formed on the upper plate portion 53, and a fastener 55 serving as a second mount portion to be fixed to the mounting hole 54. The fastener 55 includes a lower tube portion 56 having a substantially cylindrical shape with a diameter equal to a diameter of the mounting hole 54, an engaging portion 57 extending downward from a lower end portion 56a of the lower tube portion 56 and toward the center of the lower tube portion 56, and an upper tube portion 58 formed at an upper end portion 56b of the lower tube portion 56 and having a substantially cylindrical shape in which an outside diameter is larger than the diameter of the mounting hole 54 and an inside diameter gradually increases as the upper tube portion 58 extends upward from the upper end portion 56b. The lower tube portion 56, the engaging portion 57, and the upper tube portion 58 form a hole portion 59.

Incidentally, below the front panel 30, a radiator grill 60 is attached to a front face of the front body 2.

Figure 8:
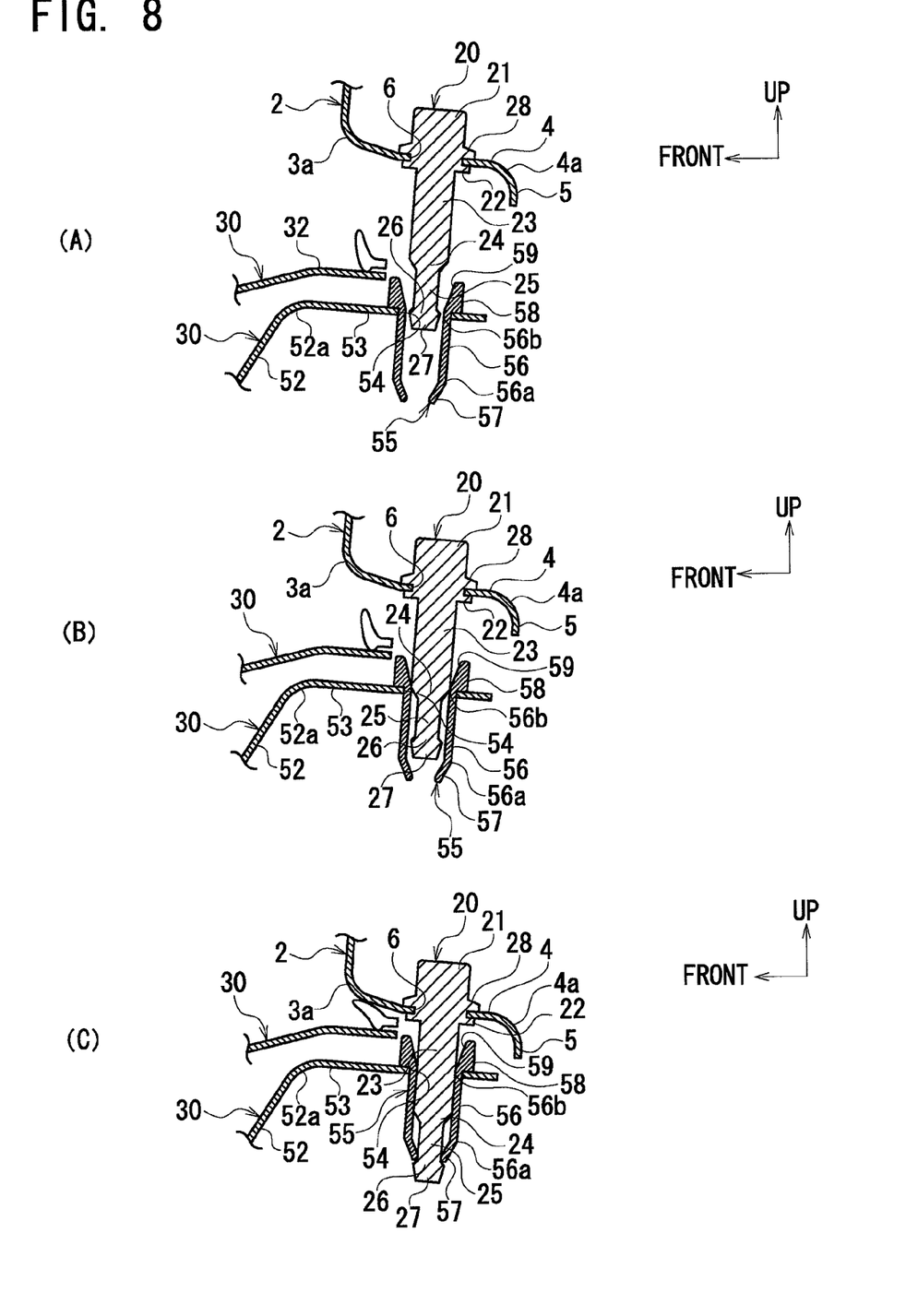
Figure 9:
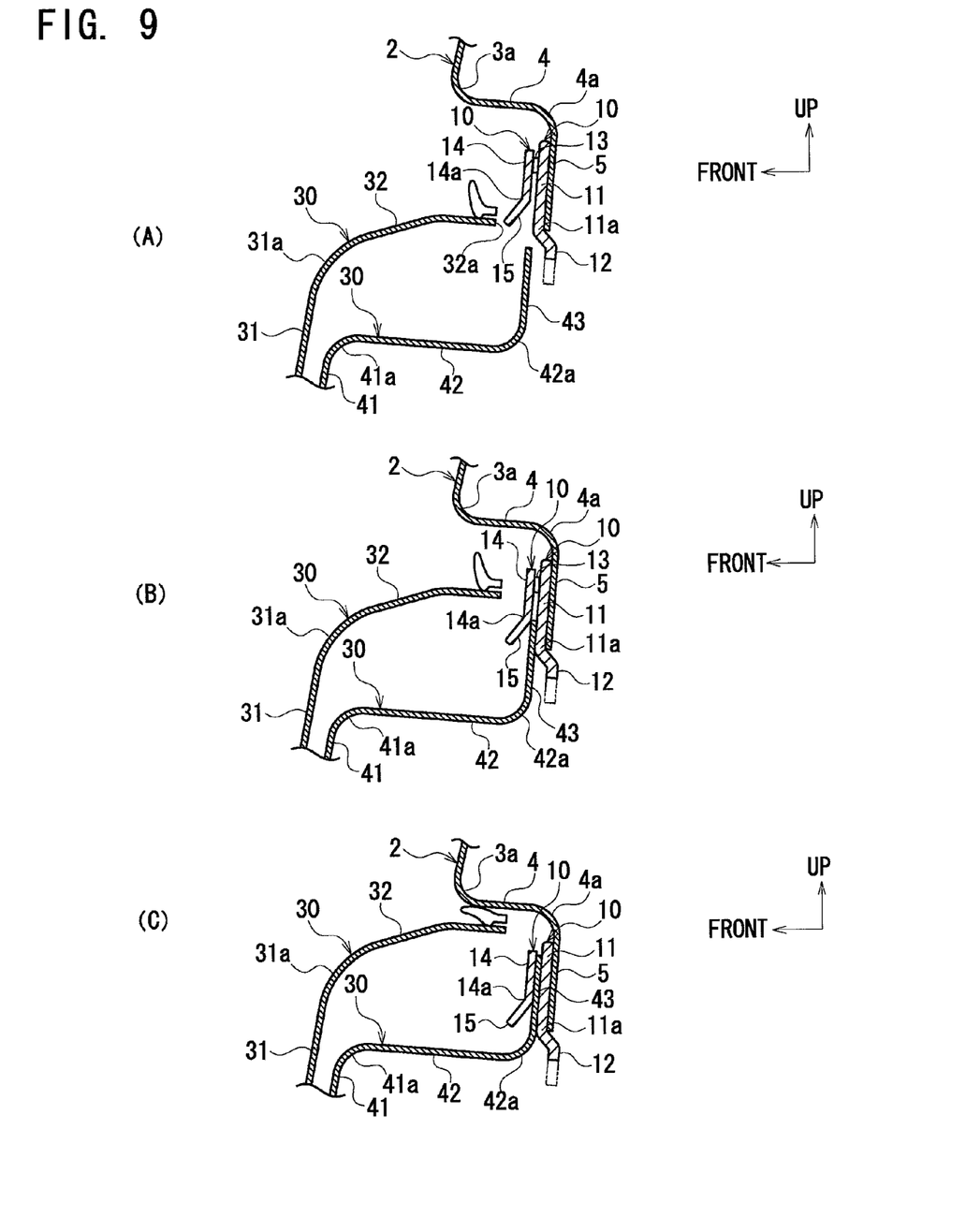

Next, mounting of the front panel 30 to the front body 2 will be described based on FIGS. 8 and 9.

As shown in FIGS. 8(A) and 9(A), when mounting the front panel 30 to the front body 2, the protruding portions 27 of the two pins 20 provided on both sides in the vehicle-width direction of the front body 2 are firstly inserted into the hole portions 59 of the two fasteners 55 provided on both sides in the vehicle-width direction of the front panel 30 (an insertion starting state). In this insertion starting state, the clip member 10 and the flange portion 43 are away from each other.

When the front panel 30 is moved upward as shown in FIGS. 8(B) and 9(B), the protruding portions 27 of the pins 20 move while being guided by the hole portions 59 of the fasteners 55. Meanwhile, the flange portion 43 begins to be sandwiched by the clip member 10.

Next, when the front panel 30 is moved further upward as shown in FIGS. 8(C) and 9(C), the protruding portions 27 of the pins 20 penetrate the hole portions 59 of the fasteners 55, whereby the locking portions 26 of the pins 20 engage with the engaging portions 57 of the fasteners 55 and the flange portion 43 is sandwiched between the rear clamp portion 11 and the front clamp portion 14 of the clip member 10. In this state, the front panel 30 is mounted to the position to occlude the opening 3 of the front body 2 (a mounted state).

In the above-described configuration, the front panel 30 is mounted on the front body 2 by engaging the flange portion 43 provided to the front panel 30 with the clip member 10 provided to the downward extending portion 5 of the front body 2 and engaging the fasteners 55 provided at both sides in the vehicle-width direction of the flange portion 43 with the pins 20 provided at both sides in the vehicle-width direction of the clip member 10, thereby establishing the mounted state of occluding the opening 3 of the front body 2. The operation to mount the front panel 30 on the front body 2 will be described further in detail. First, the protruding portions 27 of the two pins 20 provided on both sides in the vehicle-width direction of the front body 2 are inserted into the hole portions 59 of the two fasteners 55 provided on both sides in the vehicle-width direction of the front panel 30 (the insertion starting state). Next, as the front panel 30 is moved upward, the fasteners 55 move toward the pins 20 while the protruding portions 27 being guided by the hole portions 59 and the flange portion 43 is inserted between the rear clamp portion 11 and the front clamp portion 14 of the clip member 10. Thereafter, the locking portions 26 of the pins 20 engage with the engaging portions 57 of the fasteners 55 and the flange portion 43 is sandwiched between the rear clamp portion 11 and the front clamp portion 14. In this manner, the front panel 30 is brought into the mounted state. When the front panel 30 is brought into the mounted state, the movement of the front panel 30 downward and in the vehicle-width direction is restricted by the engagement of the locking portions 26 with the engaging portions 57, and the movement of the front panel 30 in the longitudinal direction is restricted by the flange portion 43 being sandwiched between the rear clamp portion 11 and the front clamp portion 14 in the longitudinal direction. In essence, the front panel 30 is positioned in the vehicle-width direction in such a manner that the front panel 30 is moved upward by inserting the protruding portions 27 into the hole portions 59, and that the locking portions 26 thereby engage with the engaging portions 57. Meanwhile, the front panel 30 is positioned in the longitudinal direction by sandwiching the flange portion 43 between the rear clamp portion 11 and the front clamp portion 14. Therefore, the front panel 30 can be positioned easily, and hence, the mounting operation of the front panel 30 can be surely made easier.

In the mounted state of the front panel 30, the front panel 30 is positioned in the vertical direction, in the vehicle-width direction, and in the longitudinal direction. Such positioning allows a gap to be evenly formed between a peripheral portion of the opening 3 of the front body 2 and an outer peripheral portion of the front panel 30, and thereby reliably improves external appearance.

Meanwhile, with the flange portion 43 held between the rear clamp portion 11 and the front clamp portion 14, the front panel 30 can be mounted on the front body 2 so that the upper fringe portion 32 may come into contact with the upper fringe portion 4 of the opening 3. Therefore, stiffness of the front body 2 and the front panel 30 at the contact point can be enhanced.

Here, the protruding portions 27 and the hole portions 59 are provided at both sides in the vehicle-width direction of the clip member 10 and the flange member 43, respectively. Accordingly, it is also possible to respectively provide the protruding portions 27 on both sides in the vehicle-width direction of the upper plate portion 53 of the front panel 30, and to respectively provide the hole portions 59 on both sides in the vehicle-width direction of the upper fringe portion 4 of the opening 3, for example. In this case, after the protruding portion 27 on one side is inserted into the hole portion 59 on one side, then the protruding portion 27 on the other side can be inserted into the hole portion 59 on the other side. This allows the elimination of complicated insertion of the multiple protruding portions 27 to the corresponding hole portions 59 at the same time. Therefore, at the time of mounting the front panel 30, the protruding portions 27 can be inserted to the hole portions 59 easily and smoothly, thereby allowing efficient mounting of the front panel 30.

Moreover, it is also possible to provide the hole portions 59 of the fasteners 55 on both sides in the vehicle-width direction of the front panel 30 and to provide the protruding portions 27 of the pins 20 on both sides in the vehicle-width direction of the front body 2.

In the above-described configuration, since the protruding portions 27 are provided on the front body 2 side, the front body 2 is less likely to be damaged because the protruding portions 27 do not come in contact with the front body 2 when the front panel 30 is mounted on the front body 2.

Further, although the embodiment has described the example of providing the clip member 10 and the pins 20 on the front body 2 side while providing the flange portion 43 and the fasteners 55 on the front panel 30 side, it is also possible to provide the flange portion 43 and the fasteners 55 on the front body 2 side and to provide the clip member 10 and the pins 20 on the front panel 30 side.

Moreover, it is also possible to provide the pins 20 and the fasteners 55 at more than two locations, respectively.

Although the embodiment employing the invention made by the inventor has been described above, the present invention shall not be limited by any of the description and the drawings of the embodiment that constitute part of the disclosure of the present invention. That is, it is needless to say that all the other embodiments, examples, and operation techniques to be carried out by those skilled in the art based on this embodiment are encompassed by the scope of the present invention.

INDUSTRIAL APPLICABILITY

The mounting structure of a front panel of the present invention can be suitably applied to various vehicles.

The invention claimed is:

1. A mounting structure for positioning a front panel on a front body to occlude an opening of the front body, the front body arranged in a vehicle-width direction, the structure comprising:

a first mount portion provided to the front panel;

at least two second mount portions provided at both sides in the vehicle-width direction of the first mount portion on an upper fringe portion of the front panel;

a first mount-base portion comprising a clip member which is provided to an upper fringe portion of the opening of the front body and engaged with the first mount portion when the front panel is positioned on the front body and occludes the opening; and at least two second mount-base portions comprising pins which are provided at both sides in the vehicle-width direction of the clip member on the upper fringe portion of the opening and respectively engaged with the second mount portions when the front panel is positioned on the front body, wherein the first mount portion includes a flange portion which protrudes toward the clip member which includes a pair of sandwiching portions positioned away from the flange portion prior to the positioning the front panel on the front body, the positioning of the front panel and the front body in a front-rear direction of a vehicle is performed by inserting the flange portion between the sandwiching portions so that the flange portion is sandwiched in a longitudinal direction to restrict movement of the front panel in the longitudinal direction, each of the pins includes a locking portion and a protruding portion which protrudes toward each of the second mount portions, each of the second mount portions comprises:

an engaging portion which engages with the locking portion to restrict movement of the front panel downward and in the vehicle-width direction, and a hole portion, the positioning of the front panel on the front body in a downward direction of the vehicle and the vehicle-width direction is performed by inserting the protruding portion into the hole portion which regulates an insertion direction of the protruding portion and guides the front panel that is moving upward.

2. The mounting structure according to claim 1, wherein the upper fringe portion of the front panel extends opposing the upper fringe portion of the opening, in the vehicle-width direction.

3. The mounting structure according to claim 1, wherein the clip member is disposed substantially in a center of the upper fringe portion of the opening, extending downward from the upper fringe portion of the opening.

4. The mounting structure according to claim 3, wherein the pins are disposed at each of the sides of the clip member, in the vehicle-width direction, extending downward from the upper fringe portion of the opening.

5. The mounting structure according to claim 1, wherein the first mount portion extends upward from the front panel.

6. The mounting structure according to claim 5, wherein the second mount portions are disposed at each of the sides of the first mount portion in the vehicle-width direction, and extend upward from the upper fridge portion of the front panel.

7. A mounting structure for positioning a front panel on a front body of a vehicle, to occlude an opening of the front body, the front body arranged in a vehicle-width direction, the structure comprising:
   a flange provided to the front panel;
   at least two fasteners provided at both sides in the vehicle-width direction of the flange on a first fringe portion of the front panel, each fastener including:
      an engaging portion, and
      a hole portion;
   a clip which is provided to a second fringe portion of the opening and includes:
      a pair of sandwiching portions which is positioned away from the flange prior to the positioning the front panel on the front body and sandwiches the flange in a longitudinal direction when the flange is inserted between the sandwiching portions, to position the front panel on the front body in a front-rear direction of the vehicle; and
   at least two pins which are provided at both sides in the vehicle-width direction of the clip on the second fringe portion and respectively engaged with the fasteners when the front panel is positioned on the front body, each pin including:
      a locking portion which engages with the engaging portion to restrict movement of the front panel downward and in the vehicle-width direction, and
      a protruding portion which is inserted into the hole portion, to position the front panel on the front body in a downward direction of the vehicle and the vehicle-width direction, the hole portion regulating an insertion direction of the protruding portion and guiding the front panel which is moving upward.

8. The mounting structure according to claim 7, wherein the first fringe portion extends opposing the second fringe portion, in the vehicle-width direction.

9. The mounting structure according to claim 7, wherein the clip is disposed substantially in a center of the second fringe portion, extending downward from the second fringe portion.

10. The mounting structure according to claim 9, wherein the pins are disposed at each of the sides of the clip, in the vehicle-width direction, extending downward from the second fringe portion.

11. The mounting structure according to claim 7, wherein the flange extends upward from the front panel, towards the clip.

12. The mounting structure according to claim 11, wherein the fasteners are disposed at each of the sides of the flange in the vehicle-width direction, and extend upward from the first fringe portion.

* * * * *